Patented Feb. 18, 1947

2,415,834

UNITED STATES PATENT OFFICE 2,415,834

DIMETHYLAMINO VITAMIN A AND ITS
CONVERSION TO VITAMIN A

Nicholas A. Milas, Belmont, Mass., assignor to
Research Corporation, New York, N. Y., a corporation of New York No Drawing. Application June 12, 1944,
Serial No. 540,002

7 Claims. (Cl. 260—563)

The object of the present invention is to provide a method for the synthesis of 1-[2',6',6'-trimethyl cyclohexene-1'-yl]-3,7-dimethyl 9-dimethylamino ennea-1,3,5,7-tetraene or simply dimethylamino vitamin A (Compound I) and its conversion to vitamin A.

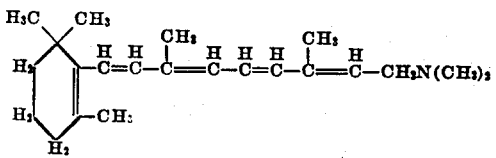

Compound I

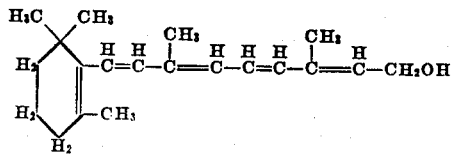

Vitamin A

The first essential step in the synthesis of dimethyl amino vitamin A (Compound I) consists in allowing the Grignard Compound VI or Compound VIa to react with dimethylamino-1 butanone-3 (Compound VII) followed by hydrolysis to give Compound VIII or VIIIa which is easily separated from the unused acetylene carbinol by extracting with a dilute acid such as phosphoric acid and regenerating the glycol by the addition of excess alkali.

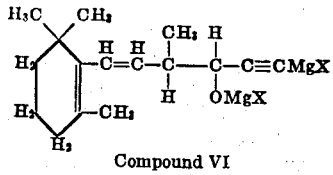

Compound VI (X stands for halogen.)

or

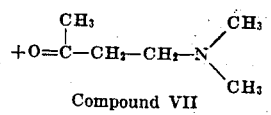

Compound VII

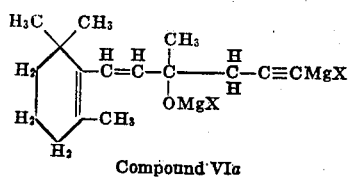

Compound VIa (X stands for halogen.)

Reflux 36 hours in ether | Hydrolysis with (NH₄)₂SO₄, NH₄Cl or tartaric acid

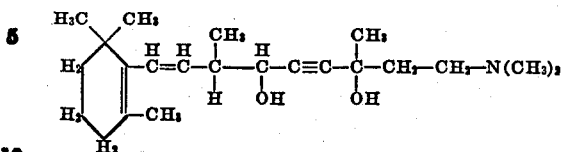

Compound VIII or

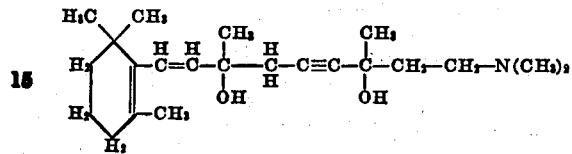

Compound VIIIa

Compounds VI and VIa above are prepared as described more fully in my application Serial No. 433,226, filed March 3, 1942, as follows:

β-Ionone is condensed with ethyl chloroacetate in the presence of solid anhydrous sodium methylate or ethylate or sodamide, using anhydrous toluene or ethyl ether as solvents, thereby producing Compound II.

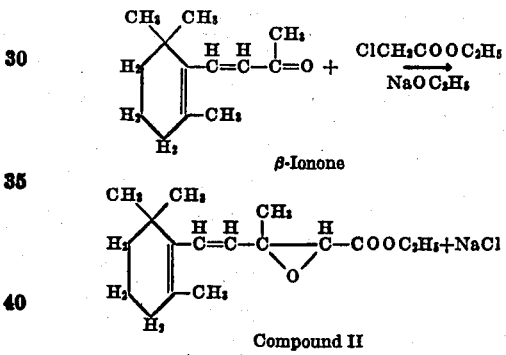

β-Ionone

Compound II

Compound II is saponified with 10% alcoholic potash and the resulting glycidic acid, Compound III, is separated and decarboxylated by distillation to produce 1-[2',6', 6'-trimethyl cyclohexene-1'-yl] 3-methyl butene-1-al-4, Compound IV.

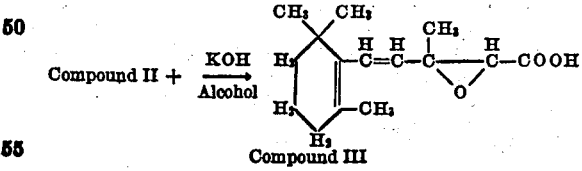

Compound III

Compound III + Distillation →

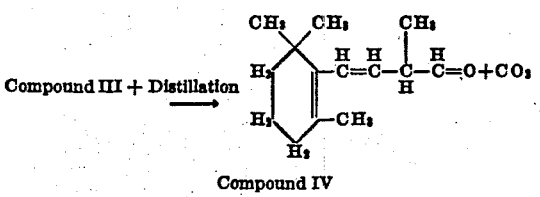

Compound IV

Instead of decarboxylating Compound III by distillation as described above, Compound III is mixed with two molecular equivalents of pyridine and the resulting pyridine salt distilled under a pressure of about 1 mm. and the fraction distilling at about from 90° C. to 103° C. (Compound IVa) collected. This fraction (Compound IVa) serves in the remainder of the process described hereinafter in the same way as Compound IV.

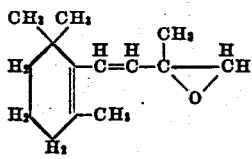

Compound IVa

Compound IV or IVa is condensed with sodium or lithium acetylide in a mixture of anhydrous ether and liquid ammonia at temperatures between —55° and —70° C. After the reaction is over, the ammonia is removed and the product treated with a dilute solution of tartaric acid, although aqueous solutions of ammonium sulfate, ammonium chloride or other organic acids may also be used. The resulting Compound V or Compound Va is extracted from this mixture in an impure state and may be purified either by high vacuum distillation in an inert atmosphere or by preparing its mercury or silver salts by treating the mixture with basic mercuric iodide (Na$_2$Hg$I_4$— Nef's reagent) or with ammoniacal alcoholic silver nitrate solution and then decomposing the mercury and silver salts with hydrogen sulphide to regenerate the pure acetylene carbinols.

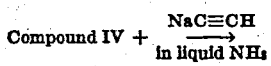

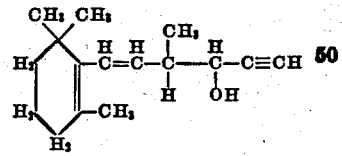

Compound V

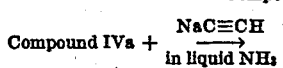

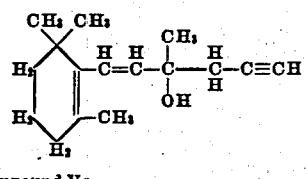

Compound Va

Compounds V and Va are converted into the Grignards thereof, Compounds VI and VIa, in the well known manner.

Compound VIII or VIIIa is then partially hydrogenated by adding exactly one mole of hydrogen (acetylene→ethylene bond) using, for example, finely divided (colloidal) palladium black on a suitable support such as calcium carbonate or charcoal.

Compound VIII or VIIIa
In absolute alcohol | Pd+H$_2$
↓

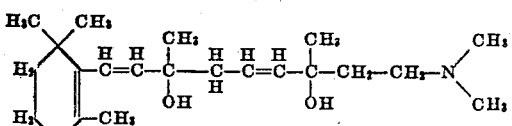

Compound IXa or

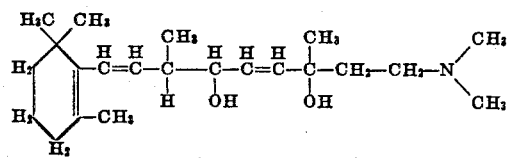

Compound IX

Compound IX or IXa which is thus produced can be dehydrated, using, for example, anhydrous copper sulfate or dehydrohalogenated by first allowing it to react with phosphorus trichloride or tribromide or thionyl chloride and treating the dihalide formed with alcoholic potash to form Compound I.

In the dehydrobromination of Compound IX or IXa there is a small loss due to the decomposition of a complex formed between the phosphorus halide or thionyl chloride and Compounds IX or IXa. This can be prevented by first forming the hydrobromide or hydrochloride salt of Compounds IX or IXa by allowing them to interact in a non-aqueous solvent with pyridine hydrobromide or hydrochloride. When these salts are used instead of Compounds IX or IXa the dehydrohalogenation proceeds smoothly to form Compound I.

An alternative procedure in the preparation of Compound I consists in preparing Compound X e.g. by the interaction of sodium acetylide in liquid ammonia with dimethylamino-1 butanone-3 (Compound VII).

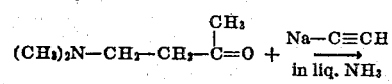

Compound VII

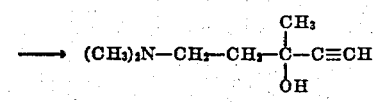

Compound X

Compound VIII or VIIIa can now be prepared by allowing the Grignard of Compound X to react in a suitable solvent with Compound IV or IVa. Better results are obtained by dehydrating or dehydrohalogenating Compound X to give Compound XI, the Grignard, lithium or sodium derivative of which is allowed to react with Compound IV or IVa to give Compound XII or XIIa. Compound XII or XIIa is then partially hydrogenated (acetylene ——→ ethylene bond) and the resulting carbinol dehydrated or dehydrohalogenated to give Compound I.

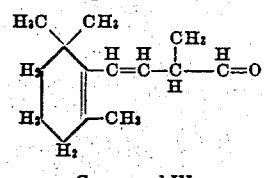

Compound IV or

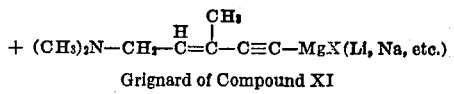

Grignard of Compound XI (X stands for halogen.)

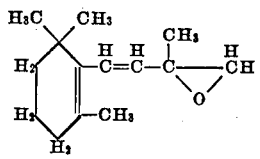

Compound IVa

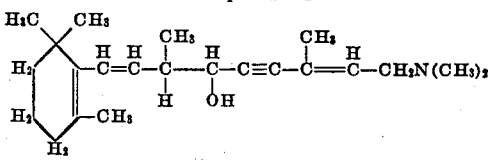

Compound XII or

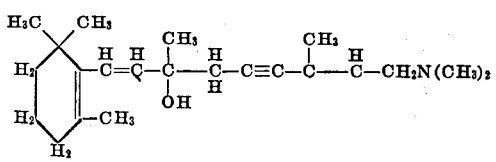

Compound XIIa

Compound I may be converted by means of the method of exhaustive methylation to vitamin A. This is accomplished by converting Compound I to the quaternary ammonium iodide, 1-[2',6',6'-trimethyl cyclohexene-1'-yl]-3,7-dimethyl 9-trimethylammonium iodide ennea-1,3,5,7-tetraene (Compound XIII), by allowing it to react in anhydrous benzene with an equivalent amount of methyl iodide. The quaternary ammonium iodide is then converted by reaction with silver hydroxide to the corresponding 9-trimethylammonium hydroxide (Compound XIV). When Compound XIV is heated at temperatures below 100° C., preferably under high vacuum, trimethylamine splits out and vitamin A is formed. These reactions are illustrated below.

Compound I+CH₃I ⟶

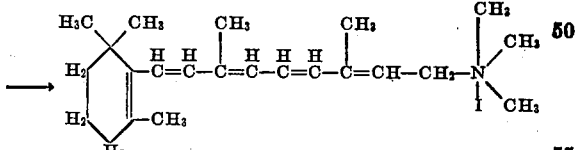

Compound XIII

↓ AgOH

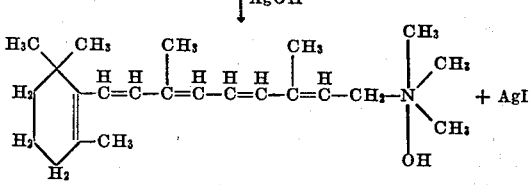

Compound XIV

↓ Heat in vacuum

Vitamin A + (CH₃)₃N

A shorter procedure for the synthesis of Compound XIV consists in converting Compound IX or IXa into the methiodide (Compound XV or XVa) by treating it with methyl iodide in petroleum ether solution. The methiodide is easily converted to the trihalogen compound (Compound XVI or XVIa) by allowing it to react in a mixture of dry benzene and pyridine with the corresponding phosphorus trihalide or thionyl chloride. When Compound XVI or XVIa is refluxed with alcoholic potash, Compound XIV is formed as an intermediate and converts into vitamin A itself upon continuation of the refluxing. The reactions may be illustrated as follows:

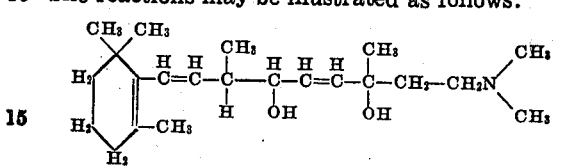

Compound IX or

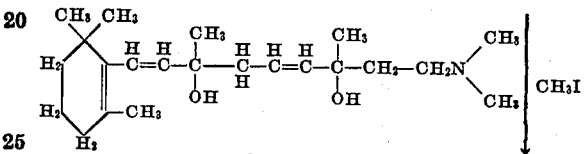

Compound IXa

↓ CH₃I

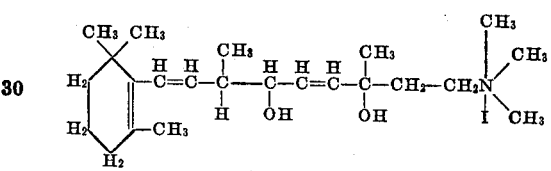

Compound XV or

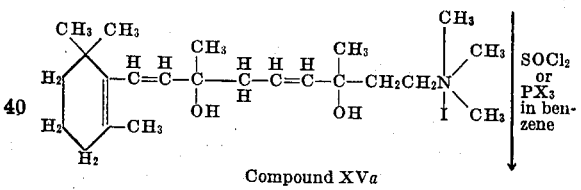

Compound XVa

↓ SOCl₂ or PX₃ in benzene

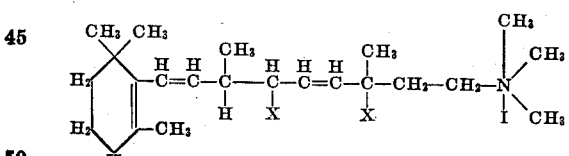

Compound XVI (X represents Cl, Br or I)

or

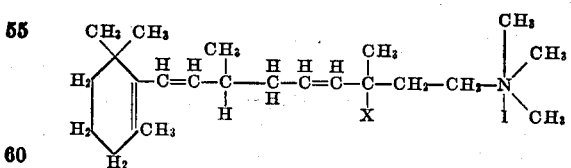

Compound XVIa (X represents Cl, Br or I)

Compound XVI or Compound XVIa + alcoholic KOH reflux ⟶ Compound XIV ⟶ Vitamin A

A more detailed description of the various synthetic steps is to be found in the following pages.

*Dimethylamino - 1 butanone - 3 (Compound VII).*—This ketone was prepared according to the method of Mannich (Mannich, Arch. Pharm. 255, 261 (1917)). A mixture of 81.5 g. dimethylamine hydrochloride, 85 g. of 37% formaldehyde, 300 g. of acetone and 160 cc. of water is heated under reflux for twelve hours. The mixture is then concentrated by distilling the excess acetone and water and the syrupy residue dissolved in the least volume of water. To this solution is then added a concentrated solution of potassium carbonate and the potassium chloride precipitated removed by filtration. When the filtrate is warmed on the water bath, the amine carbonate is decomposed and the keto-amine separated as an oil. Instead of using potassium carbonate, one may use concentrated potassium hydroxide to decompose the keto-amine hydrochloride, provided the reaction is accomplished at temperatures below zero. The keto-base is then dried over solid potassium hydroxide, fractionated under reduced pressure and the fraction boiling at 50–52° (13 mm.) collected as the keto-base. Yield, 34%.

The base forms a peculiarly smelling oil when warmed with water; forms a highly hygroscopic hydrochloride and a water soluble platinum double salt. A gold salt prepared from gold chloride and recrystallized from alcohol was found to melt at 124°–126°.

*Synthesis of 1-[2',6',6'-trimethyl cyclohexene-1'-yl]- 3',7-dimethyl 4(3),7-dihydroxy 9-dimethylamino 5-yne nonene-1 (Compound VIII or VIIIa).*—Prepare a Grignard reagent in a liter of anhydrous ether from 6.08 g. (0.25 mole) of magnesium and 27.3 g. (0.25 mole) of pure ethyl bromide. Cool the mixture to 0° in an atmosphere of nitrogen and add in the course of 15 minutes with rapid stirring 31.2 g. (0.134 mole) of acetylene carbinol (1-[2',6',6'-trimethyl cyclohexene-1'-yl]-3-methyl 4(3)-hydroxy 1-enehexyne-5, Compound V or Va) in 25 cc. of dry ether. Reflux the mixture gently in nitrogen for 2 hours, then cool to 0° and add to the resulting solution containing Compound VI or VIa, in the course of 15 minutes, 13.5 g. of dimethyl-amino-1 butanone-3, Compound VII, in 25 cc. of dry ether. A voluminous white precipitate is formed immediately. The mixture is gently refluxed for 48 hours. Cool to 0° and add with rapid stirring a solution of 200 cc. of ammonium chloride containing 27 g. (0.5 mole) of ammonium chloride, and extract several times with ether. Shake ether extracts with 6×50 cc. of 5% phosphoric acid which removes all of the di-methylamino glycol (Compound VIII or VIIIa). To liberate the free dimethylamino glycol, the phosphoric acid solution is cooled to 0° and solid potassium or sodium hydroxide is added in excess and the mixture extracted with ether. The ether extract is then dried over anhydrous barium oxide, filtered and the ether removed. The highly viscous residue is subjected to a high vacuum (10⁻⁴–10⁻⁵ mm.) at about 50–60° to remove low-boiling impurities and the residue analyzed. Semimicro hydrogenation shows the presence of 3.92 double bonds as against the calculated value of 4.00. It gives an active hydrogen number of 1.80 as against the calculated value of 2.00

To prepare Compound IX or IXa, Compound VIII or VIIIa is dissolved in alcohol and palladium black is added in about 1 g. to 7 g. of the dimethylamino glycol, then the calculated amount of hydrogen is added to partially hydrogenate the acetylene bond into the ethylene bond.

*Synthesis of dimethylamino vitamin A by dehydrohalogenation of Compound IX or IXa.*—To 75 cc. of dry benzene add 16 g. of phosphorus tribromide and allow nitrogen to pass through the solution for 10–15 minutes in order to displace any free hydrogen bromide present. Cool the mixture to 0° and add to it slowly in the course of ½ hour a mixture of 10.2 g. of Compound IX or IXa in 75 cc. of dry benzene and 15 cc. of dry pyridine. Heat the mixture to 60–80° while nitrogen is passing through it for ¾ hour, then remove the benzene under reduced pressure. Cool the residue to 0° and add to it 28 g. of potassium hydroxide in 280 cc. of 95% alcohol and heat the mixture on a hot water bath while nitrogen is passing through it and under slightly reduced pressure for one hour. Remove most of the alcohol under reduced pressure and dilute the residue with about five volumes of water and extract several times with petroleum ether.

Shake the combined petroleum ether extracts a number of times with 5% phosphoric acid to remove Compound I and other basic products. The non-basic product in petroleum ether gave a deep blue color with antimony trichloride in chloroform which had a prominent absorption band at 6200 Å. An ultra-violet absorption spectrum of this non-basic product showed a prominent band, the peak of which is at 3280 Å. Biologically, it exhibits all properties of vitamin A. It was therefore concluded that this material was vitamin A and was formed as a by-product in the dehydrobromination reaction The basic product (Compound I) is recovered from phosphoric acid by cooling the mixture to 0° and adding to it solid potassium hydroxide until the mixture is distinctly basic. The mixture is then extracted with ether, and the ethereal solution dried over anhydrous barium oxide. The final product is contaminated with undehydrobrominated glycol. The mixture (7.5 g.) is then converted into the methiodide by adding to it in petroleum ether excess methyl iodide and allowing the mixture to stand at room temperature over night.

The solid methiodide is then treated in the same manner as Compound IX or IXa (dehydrobrominated) and from the final reaction mixture 1.5 g. of vitamin A is recovered.

The hydrobromide of the dimethylamino glycol (Compound IX or IXa) was prepared by dissolving 27.8 grams of the latter in 80 cc. of dry benzene and adding to it 15.1 grams of crystalline pyridine hydrobromide. The mixture was heated in an atmosphere of nitrogen at 60–80 degrees C. for one hour, then allowed to stand overnight. The mixture became dark brown, almost red, and most of the solid pyridine hydrobromide had gone into solution. The benzene was then removed under reduced pressure and the residue purified by recrystallizing it from petroleum ether. This hydrobromide was used in the dehydrobrominations instead of Compound IX or IXa.

*Synthesis of β - dimethylaminoethyl - ethynyl carbinol (Compound X).*—Into a 1500–1600 cc. of liquid ammonia, in a 3-l., three-necked flask equipped with an efficient stirrer and surrounded by an acetone-carbon dioxide freezing mixture, a rapid stream of dry acetylene is passed for about five minutes. While acetylene is still being passed, 23 g. (1 atom) of sodium is slowly added in the course of one hour taking care that the blue color formed with each addition is completely decolorized before more sodium is added. The temperature of the bath should be maintained at −50° to −40°. The temperature of the bath is then lowered to −70° and acetylene is allowed to pass through the mixture for an additional one hour. To this mixture is then slowly added with vigorous stirring 115 g. (1 mole) of dimethylamino-1 butanone-3, Compound VII, during a period of two and one-half hours. The mixture is stirred at about −70° for eight hours longer, then the ammonia is allowed to evaporate while acetylene is being passed through the mixture. The light brown syrupy residue is cooled to 0° and 600 cc. of ether added followed by 600 cc. of aqueous potassium bisulfate solution containing 136 g. (1 mole) of potassium bisulfate. The ethereal layer is separated, and the aqueous layer salted out and again extracted three times with 300 cc. of ether. The ether extracts are combined and dried over anhydrous magnesium sulfate; the mixture filtered and the ether removed under reduced pressure. The solid crystalline residue is further purified by dissolving it in 150 cc. pure petroleum ether and the solution cooled to −10°. A yield of 55 g. (39%) of the pure crystalline product M. P. 37–38° is obtained. The solid is unstable at room temperature and should be kept at 0° or below.

Anal. calcd. for $C_8H_{15}ON$: N, 9.9; unsaturation, 1 triple bond. Found: N, 10.3, 10.6; unsaturation, 1.08 triple bond.

The acetylene carbinol, compound X, yields a white silver salt with ammoniacal silver nitrate and forms a stable crystalline hydrochloride M. P. 149–151°.

An alternative procedure for the synthesis of Compound X is as follows:

To 400 cc. of anhydrous t-butyl alcohol (distilled over a small amount of metallic sodium) in a 3 liter, 3-necked flask equipped with a Hershberg stirrer, a dropping funnel and a bent side tube, add 20 g. of metallic potassium. After all of the potassium had dissolved, cool the mixture to room temperature and, while stirring, pass through it dry acetylene for one hour. Add slowly, in the course of two hours, while a rapid stream of acetylene is being passed through the solution, 57.5 g. of dimethyl-amino-1 butanone-3 (Compound VII) dissolved in about 200 cc. of anhydrous ether or some other low-boiling inert solvent. Continue stirring and passing acetylene for six hours longer. Pour the product slowly into 500 cc. of ammonium chloride solution containing 43 g. of ammonium chloride. Extract the mixture several times with ether and dry the combined extracts over anhydrous magnesium sulfate, then over anhydrous barium oxide, filter and remove ether under reduced pressure in an atmosphere of nitrogen. Recrystallize the residue from petroleum ether.

A third procedure for the synthesis of Compound X consists in allowing a steady current of dry acetylene to pass through a well cooled (−20°) suspension of about 20 g. of finely powdered sodamide (or lithiumamide) in 500 cc. anhydrous ether to saturate the latter, then adding dropwise 57.5 g. of dimethylamino-1 butanone-3 (Compound VII) in the course of 3 hours, keeping the mixture well stirred. Continue passing acetylene through the mixture for 8 hours longer, then pour mixture on ice and ammonium chloride mixture and extract twice with ether. Dry ethereal solution with anhydrous magnesium sulfate, then with anhydrous barium oxide. Evaporate ether in an atmosphere of $N_2$ and recrystallize the residue from petroleum ether.

*Preparation of the methiodide of Compound IX or IXa (Compound XV or XVa).*—To 26 g. of Compound IX or IXa is added in 150 cc. of petroleum ether twice the calculated amount of methyl iodide and the mixture allowed to stand at room temperature over night. The methio- dide precipitates out of the solution as a pale yellowish-white powder (33.5 g.).

*Conversion of methiodide (Compound XV or XVa) into vitamin A.*—To 150 cc. of dry benzene is added 34.2 g. of phosphorus tribromide and nitrogen passed through the mixture for ½ hour. The mixture is then cooled to 0° and to it added 31 g. of methiodide (Compound XV or XVa) in 100 cc. of dry benzene and 41 cc. of dry pyridine in the course of 15 minutes. The mixture is then heated in nitrogen at 60–80° for one hour, then the benzene is removed under reduced pressure. The residue (Compound XVI or XVIa) is cooled to 0° and treated with 60 g. of potassium hydroxide in 600 cc. of 95% alcohol and the mixture heated on the water bath in an atmosphere of nitrogen and under slightly reduced pressure for one hour, then most of the alcohol removed under reduced pressure. The residue is then diluted with five volumes of water and the resulting mixture extracted with 6×150 cc. of petroleum ether. To remove any unconverted basic material, the petroleum ether extract is shaken several times with 5% phosphoric acid, then twice with 10% salt solution and dried over anhydrous magnesium sulfate. This extract gives a deep blue color with antimony trichloride in chloroform, and shows a very strong ultra-violet absorption in the neighborhood of 3200–3300 Å, and is therefore identical with the previous preparations.

This application is a continuation-in-part of my application Serial No. 353,775, filed August 22, 1940, and of my application Serial No. 433,226, filed March 3, 1942.

I claim:

1. Process for the synthesis of vitamin A which comprises condensing a compound of the group consisting of

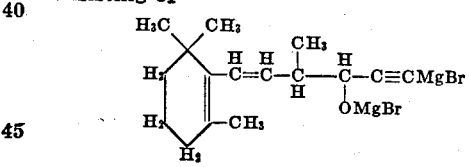

and

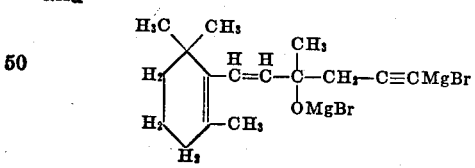

with a compound of the formula

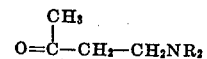

in which R stands for an alkyl radical, reducing the acetylenic linkage of the resulting compound to an ethylenic linkage, removing water to form a conjugated system of five double linkages, and replacing the dialkylamino radical of the resulting compound by a hydroxyl radical.

2. Process for the synthesis of a dialkylamino vitamin A which comprises condensing a compound of the group consisting of

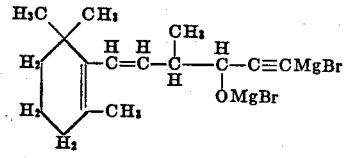

and

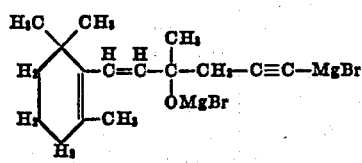

with a compound of the formula

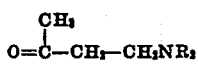

in which R stands for an alkyl radical, reducing the acetylene linkage of the resulting compound to an ethylenic linkage, and removing water to form a conjugated system of five double linkages.

3. Process as defined in claim 2 in which the compound of the formula

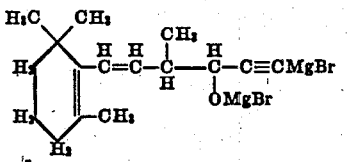

is employed.

4. Process as defined in claim 2 in which the compound of the formula

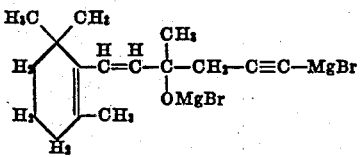

is employed.

5. As a new product a compound of the formula

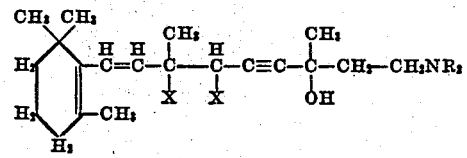

in which R stands for an alkyl group; one X stands for hydrogen and the other X stands for an hydroxyl group.

6. As a new product a compound of the formula

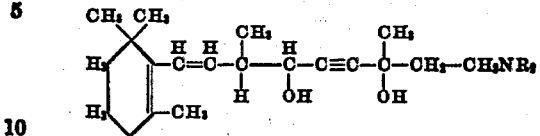

in which R stands for an alkyl group.

7. As a new product a compound of the formula

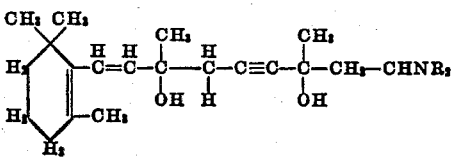

in which R stands for an alkyl group.

NICHOLAS A. MILAS.

REFERENCES CITED

The following references are of record in the file of this patent:

UNITED STATES PATENTS

| Number | Name | Date |
|---|---|---|
| 691,157 | Merling | Jan. 14, 1902 |
| 2,119,802 | Westphal et al. | June 7, 1938 |
| 2,135,521 | Major | Nov. 8, 1938 |
| 2,365,825 | Kyrides | Dec. 26, 1944 |
| 778,243 | Hofmann | Dec. 27, 1904 |

FOREIGN PATENTS

| Number | Country | Date |
|---|---|---|
| 25,695 | British | 1903 |